(12) United States Patent
Huang

(10) Patent No.: US 11,333,943 B2
(45) Date of Patent: May 17, 2022

(54) DISPLAY PANEL, DISPLAY DEVICE, AND MANUFACTURING METHOD

(71) Applicant: HKC CORPORATION LIMITED, Shenzhen (CN)

(72) Inventor: Shishuai Huang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 340 days.

(21) Appl. No.: 16/349,972

(22) PCT Filed: Nov. 29, 2018

(86) PCT No.: PCT/CN2018/118046
§ 371 (c)(1),
(2) Date: May 14, 2019

(87) PCT Pub. No.: WO2020/087617
PCT Pub. Date: May 7, 2020

(65) Prior Publication Data
US 2021/0325746 A1    Oct. 21, 2021

(30) Foreign Application Priority Data

Oct. 30, 2018  (CN) .......................... 201811273779.9

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC .......................... G02F 1/136286; G02F 1/1368
See application file for complete search history.

(56) References Cited

U.S. PATENT DOCUMENTS

2008/0316413 A1   12/2008   Cho

FOREIGN PATENT DOCUMENTS

| CN | 101221331 A |   | 7/2008  |        |              |
|----|-------------|---|---------|--------|--------------|
| CN | 102749751 A | * | 10/2012 |        |              |
| CN | 102749751 A |   | 10/2012 |        |              |
| CN | 103901682 A |   | 7/2014  |        |              |
| CN | 104460077 A | * | 3/2015  | ....... | G02F 1/133514 |
| CN | 104460077 A |   | 3/2015  |        |              |
| CN | 104701354 A |   | 6/2015  |        |              |

(Continued)

OTHER PUBLICATIONS

English machine translation of CN 104460077A (Year: 2015).*

(Continued)

*Primary Examiner* — Anne M Hines

(57) ABSTRACT

The present application discloses a display panel, a display device, and a manufacturing method. The display panel includes a plurality of first pixels and a plurality of second pixels, where a color of each first pixel is different from that of each second pixel; the first pixels are configured as a high domain region, and the second pixels are configured as a low domain region; the number of alignment regions of the high domain region is greater than that of alignment regions of the low domain region; and in the display panel, the number of alignment regions of the pixels of the same row or the same column is the same.

15 Claims, 4 Drawing Sheets

(56) References Cited

FOREIGN PATENT DOCUMENTS

CN         105481298 A     4/2016
CN         105529008 A     4/2016

OTHER PUBLICATIONS

English machine translation of CN 102749751A (Year: 2012).*
International Search Report issued in corresponding International application No. PCT/CN2018/118046, dated Jul. 25, 2019.
Written Opinion of the International Searching Authority for No. PCT/CN2018/118046.
First Office Action from China patent office in a counterpart Chinese patent Application 201811273779.9 dated Mar. 19, 2020 (7 pages).

* cited by examiner

DISPLAY PANEL, DISPLAY DEVICE, AND MANUFACTURING METHOD

The present application claims priority to Chinese Patent Application No. CN201811273779.9, filed with National Intellectual Property Administration, PRC on Oct. 30, 2018, and entitled "DISPLAY PANEL, DISPLAY DEVICE, AND MANUFACTURING METHOD", which is incorporated herein by reference in its entirety.

TECHNICAL FIELD

The present application relates to the technical field of display, and in particular, to a display panel, a display device, and a manufacturing method.

BACKGROUND

The statements herein merely provide background information related to the present application and do not necessarily constitute the prior art.

With the development and advancement of technology, liquid crystal displays are currently the most widely used displays on the market, especially for LCD TVs.

With the gradual increase of the resolution of a display panel, the sizes of pixels become smaller and smaller, and the aperture ratio is also smaller and smaller. The brightness of the backlight should be greatly improved to meet the brightness demand. High-brightness backlight needs to increase power, which will consume more power, and the corresponding cost will also increase. At the same time, the environmental power consumption will become larger, which is not conducive to environmental protection. High-resolution liquid crystal displays require high transmittance to reduce backlight power consumption and costs. After liquid crystal molecules are arranged and oriented, when the liquid crystal molecules are viewed at different angles, the color shift is generated due to the different transmittance of the liquid crystal molecules; the color shift occurs at a large viewing angle, and thus the influence of the color shift on the display needs to be reduced.

SUMMARY

An objective of the present application is to provide a display panel, a display device, and a manufacturing method to eliminate color shift produced by liquid crystal display.

To achieve the above objective, the present application provides a display panel, which includes: a plurality of first pixels and a plurality of second pixels, where the plurality of first pixels have the same color, and the plurality of second pixels have the same color; the color of the first pixels is different from that of the second pixels; the first pixels are configured as a high domain region, and the second pixels are configured as a low domain region; the number of alignment regions of the high domain region is greater than that of alignment regions of the low domain region; and in the display panel, the number of alignment regions of the pixels of the same row or the same column is the same.

Optionally, the display panel includes gate scan layers and common lines, and the first pixels each include a main pixel and sub-pixels; the first pixels corresponding to the same gate scan layer are provided with three thin film transistors; drain electrodes of two of the thin film transistors are connected with the main pixel and the sub-pixels respectively, and source electrodes are connected with a same data line; a source electrode of the other thin film transistor is connected with the sub-pixels corresponding to the upper gate scan layer, and a drain electrode is connected to the common lines.

Optionally, the lightness of the first pixels is higher than that of the second pixels.

Optionally, the lightness of the first pixels is lower than that of the second pixels.

Optionally, the display panel includes white pixels; the white pixels are the first pixels, and the white pixels are correspondingly configured as a high domain region.

Optionally, the display panel includes third pixels and fourth pixels; the white pixels are the first pixels, and the white pixels are correspondingly configured as a high domain region; the second pixels and the third pixels correspond to low domain regions, and the fourth pixels correspond to a high domain region; the lightness of the fourth pixels is the lowest, and the lightness of the first pixels is the highest.

Optionally, the first pixels, the second pixels, the third pixels, and the fourth pixels are each one pixel group with two rows and two columns, and in each pixel group, the second pixels and the third pixels are in the same column; the first pixels and the fourth pixels are in the same column; the second pixels and the fourth pixels are in the same row, and the first pixels and the third pixels are in the same row.

Optionally, the first pixels, the second pixels, the third pixels, and the fourth pixels are each one pixel group, and in each pixel group, the first pixels, the second pixels, the third pixels, and the fourth pixels are in the same row.

Optionally, the low domain region has four alignment regions, and the high domain region has eight alignment regions.

The present application also discloses a manufacturing method for a display panel; the display panel includes a plurality of first pixels and a plurality of second pixels, and the manufacturing method includes: setting a plurality of first pixels and a plurality of second pixels, where colors corresponding to the first pixels and the second pixels are different; where the first pixels are configured as a high domain region, and the second pixels are configured as a low domain region; and the number of alignment regions of the high domain region is greater than that of alignment regions of the low domain region.

Optionally, the step of setting a plurality of first pixels and a plurality of second pixels includes: disposing a pixel electrode of the first pixels and a pixel electrode of the second pixels on a first substrate of the display panel; and disposing color photoresist layers corresponding to the first pixels and the second pixels on a second substrate of the display panel.

The present application also discloses a display device including the display panel as described above.

In this solution, the display panel includes first pixels and second pixels; the number of the first pixels and the number of the second pixels are plural; the first pixels are correspondingly configured as a high domain region, and the second pixels are correspondingly configured as a low domain region. The number of alignment regions of the first pixels and the number of alignment regions of the second pixels are different. With respect to a solution of configuring the first pixels and the second pixels as high domain regions, the number of the alignment regions of the high domain regions is large, and the configuration viewing angle of the high domain regions is good, and the configuration of the high domain regions reduces the aperture area and thus sacrifices the aperture ratio; with respect to a solution of configuring the first pixels and the second pixels as low domain regions, the configuration of the low domain regions allows the aperture area to be relatively large and the aperture ratio to be high. However, the viewing angle will be poor, so that the customer experience will be poor. In this solution, the high domain region and the low domain region are in hybrid configuration; the configuration of the low domain region ensures a certain transmittance, and the configuration of the high domain region improves color shift of a large viewing angle, so that the hybrid configuration of the high domain region and the low domain region improves color shift and the quality of the display panel at a large viewing angle of the product while ensuring a certain transmittance. The number of alignment regions of pixels in the same row or in the same column is the same, and the same row or the same column of a photomask has the same number of alignment regions; a pattern is the same, and the design of the photomask is simpler.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts.

In the accompanying drawings.

DETAILED DESCRIPTION

Figure 1:
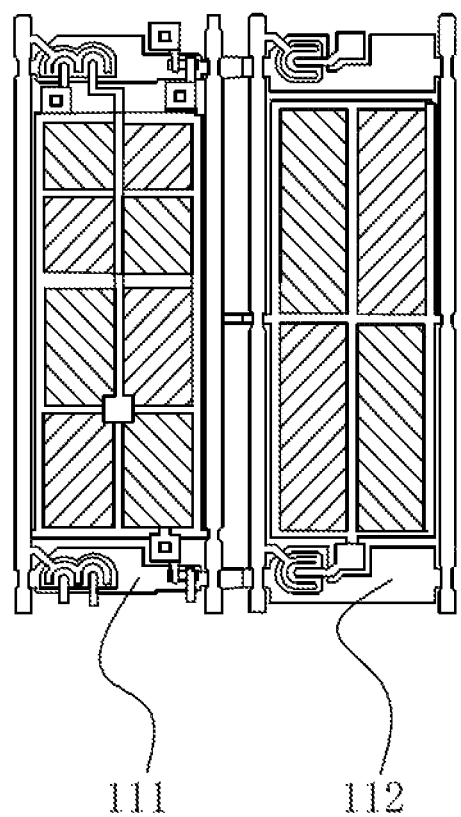
FIG. 1 is a schematic view of configuring first pixels of a display panel as a high domain region and configuring second pixels as a low domain region according to an embodiment of the present application.

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal". "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms "first", "second" are merely for a descriptive purpose, and cannot to be understood to indicate or imply relative importance, or implicitly indicate the number of the indicated technical features. Hence, the features defined by "first" and "second" can explicitly or implicitly include one or more features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with". "connected to" should be comprehended in a broad sense. For example, these terms may be comprehended as being fixedly connected, detachably connected or integrally connected; mechanically connected or electrically connected; or directly connected or indirectly connected through an intermediate medium, or in an internal communication between two elements. The specific meanings about the foregoing terms in the present application may be understood by those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

Liquid crystal displays are currently the most widely used displays on the market, especially for LCD TVs. With the gradual increase of the resolution, the sizes of pixels will become smaller and smaller, and the aperture ratio will also be smaller and smaller. The brightness of the backlight should be greatly improved to meet the brightness demand. High-brightness backlight needs to increase power, which will consume more power, and the corresponding cost will also increase. At the same time, the environmental power consumption will become larger, which is not conducive to environmental protection. Therefore, high-resolution liquid crystal displays require high transmittance to reduce backlight power consumption and costs.

The present application will be further described below with reference to the accompanying drawings and optional embodiments.

Referring to FIG. 1, an embodiment of the present application discloses a display panel 110, which includes: a plurality of first pixels 111 and a plurality of second pixels 112, where the plurality of first pixel 111 have the same color, and the plurality of second pixels 112 have the same color; the color of the first pixels 111 is different from that of the second pixels 112; the first pixels 111 are configured as a high domain region, and the second pixels 112 are configured as a low domain region; the number of alignment regions of the high domain region is greater than that of alignment regions of the low domain region; and in the display panel 110, the number of alignment regions of the pixels of the same row or the same column is the same.

In this solution, the display panel 110 includes first pixels 111 and second pixels 112; the number of the first pixels 111 and the number of the second pixels 112 are plural; the first pixels 111 are correspondingly configured as a high domain region, and the second pixels 112 are correspondingly configured as a low domain region. The number of alignment regions of the first pixels 111 and the number of alignment regions of the second pixels 112 are different. With respect to a solution of configuring the first pixels 111 and the second pixels 112 as high domain regions, the number of the alignment regions of the high domain regions is large, and the configuration viewing angle of the high domain regions is good, and the configuration of the high domain regions reduces the aperture area and thus sacrifices the aperture ratio; with respect to a solution of configuring the first pixels 111 and the second pixels 112 as low domain regions, the configuration of the low domain regions allows the aperture area to be relatively large and the aperture ratio to be high. However, the viewing angle will be poor, so that the customer experience will be poor. In this solution, the high domain region and the low domain region are in hybrid configuration; the configuration of the low domain region ensures a certain transmittance, and the configuration of the high domain region improves color shift of a large viewing angle, so that the hybrid configuration of the high domain region and the low domain region improves color shift and the quality of the display panel 110 at a large viewing angle of the product while ensuring a certain transmittance. The number of alignment regions of pixels in the same row or in the same column is the same, and the same row or the same column of a photomask has the same number of alignment regions; a pattern is the same, and the design of the photomask is simpler.

The first pixels 111 each include a main pixel and sub-pixels, and a same gate scan layer is provided with three thin film transistors; drain electrodes of two of the thin film transistors are connected with the main pixel and the sub-pixels respectively, and a source electrode of the other thin film transistor is connected with the sub-pixels of the upper gate scan layer. The thin film transistors of the gate scan layer of the same layer are simultaneously switched on, the main pixel and the sub-pixels are simultaneously charged, and the charge amount of the main pixel and the sub-pixels are the same; when thin film transistor switches of the upper layer are switched off, the thin film transistors of the next layer are switched on. Since the sub-pixels of the upper layer and a common electrode have overlapping areas, a discharge capacitor is generated, and the power of the sub-pixels is lost to some extent. At this time, the voltage of the main pixel is greater than that of the sub-pixels, and the lightness of the sub-pixels is lower than that of the main pixel. According to the characteristics of the VA type, when the display panel 110 is of a large size, when viewed from different viewing angles, the lightness at both sides is higher, and unevenness in brightness and darkness may occur. The pixels are correspondingly configured as the high domain region for matching, and the brighter lightness at the two sides matches the darker lightness, thereby improving color shift.

In one or more embodiments, the lightness of the first pixels 111 is higher than that of the second pixels 112.

In this solution, the first pixels 111 are correspondingly configured as a high domain region, and the second pixels 112 are correspondingly configured as a low domain region; and the lightness of the first pixels 111 is higher than the that of the second pixels 112. In this solution, the pixels with higher lightness are configured as a high domain region; although the configuration of the high domain region has a certain influence on the transmittance, since the pixels with higher lightness have a large lightness proportion as a whole, the influence on the overall lightness is not very large even if there is a little loss, and thus the influence on the overall transmittance of the display panel 110 is not too large. In the case of sacrificing a small transmittance, the corresponding configuration of the first pixels 111 as a high domain region can improve the large viewing angle color shift defect.

Certainly, it is also possible that the lightness of the first pixels 111 is lower than that of the second pixels 112.

In this solution, the first pixels 111 are correspondingly configured as a high domain region, and the second pixels 112 are correspondingly configured as a low domain region; and the lightness of the first pixels 111 is lower than that of the second pixels 112. In this solution, the pixels with darker lightness are configured as a high domain area. Since the lightness of the pixels with darker lightness does not contribute much to the brightness of the entire panel, the first pixels 111 with darker lightness are correspondingly configured as a high domain area, which, on the one hand, has a little effect on the overall lightness of the display panel 110, and on the other hand, can improve the large viewing angle color shift.

In one or more embodiments, the display panel 110 includes white pixels; the white pixels are the first pixels 111, and the white pixels are correspondingly configured as a high domain region.

In this solution, the first pixels 111 are white pixels and are correspondingly configured as a high domain region. For the display panel 110 provided with white pixels, the white pixels are brightest relative to the pixels of other colors; when the white pixels are correspondingly configured as a high domain region, although the transmittance of the white pixels is affected, because the white pixels are the brightest, the effect on the overall transmittance is not very large, and a certain transmittance can be ensured; at the sacrifice of a small transmittance, the white pixel configuration as a high domain region can greatly improve the large viewing angle color shift, thereby improving the quality of the product against color shift at a large viewing angle. In addition, the lightness of the white pixels configured as the high domain region is lowered, closer to that of each low domain region of other colors, and the overall lightness uniformity of the panel is better.

Figure 2:
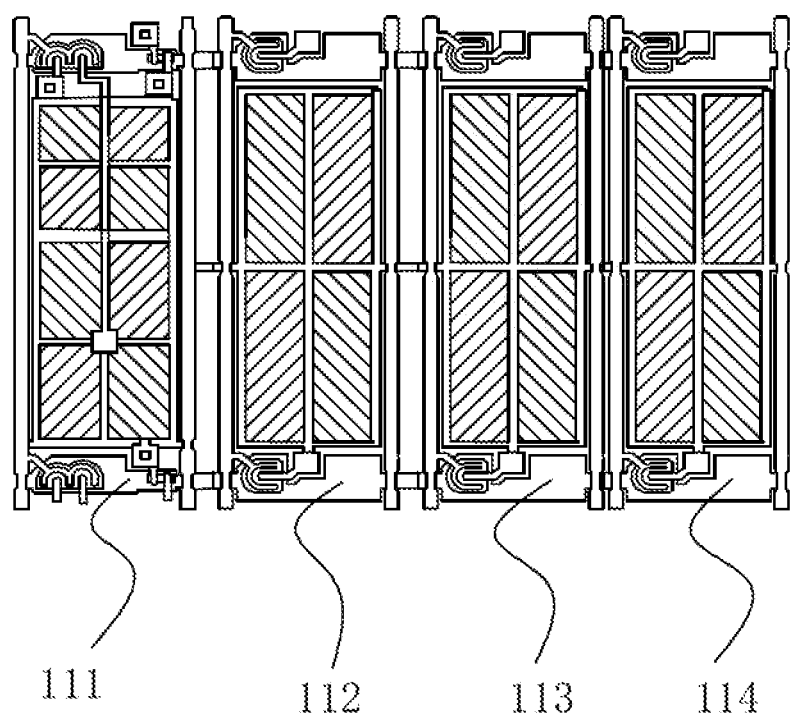
FIG. 2 is a schematic view of RGBW same-row display of a display panel according to an embodiment of the present application.

In one or more embodiments, referring to FIG. 2, the display panel 110 includes third pixels 113 and fourth pixels 114; the white pixels are the first pixels 111, and the white pixels are correspondingly configured as a high domain region; the second pixels 112 and the third pixels 113 correspond to the low domain region, and the fourth pixels 114 correspond to the high domain region; the lightness of the fourth pixels 114 is the darkest, and the lightness of the first pixels 111 is the brightest.

The white pixels are the first pixels 111, red pixels are the second pixels 112, green pixels are the third pixels 113, and blue pixels are the fourth pixels 114.

In this solution, the display panel 110 includes first kinds of pixels; the white pixels are the first pixels 111 and correspondingly configured as a high domain region; the fourth pixels 114 are configured as a high domain region; and the second pixels 112 and the third pixels 113 are correspondingly configured as a low domain region. The white pixel is the brightest among the four pixels, and the white pixel is the brightest in lightness with respect to the pixels of other colors; when the white pixels are correspondingly configured as the high domain region, although the white pixel transmittance is affected, the influence on the overall transmittance is not very large because the white pixels are the brightest, and a certain transmittance can be ensured; the lightness of the fourth pixel 114 is the darkest; because the lightness of the fourth pixel 114 itself with a lower lightness does not contribute much to the lightness of the overall panel, the fourth pixels 114 are correspondingly configured as a high domain region, and the lightness of the fourth pixels 114 does not change much. Therefore, the brightest pixels and the darkest pixels are configured as high-domain regions, and at the expense of a small transmittance, the large viewing angle color shift can be greatly improved, thereby improving the quality of large viewing angle color shift of the product.

Figure 3:
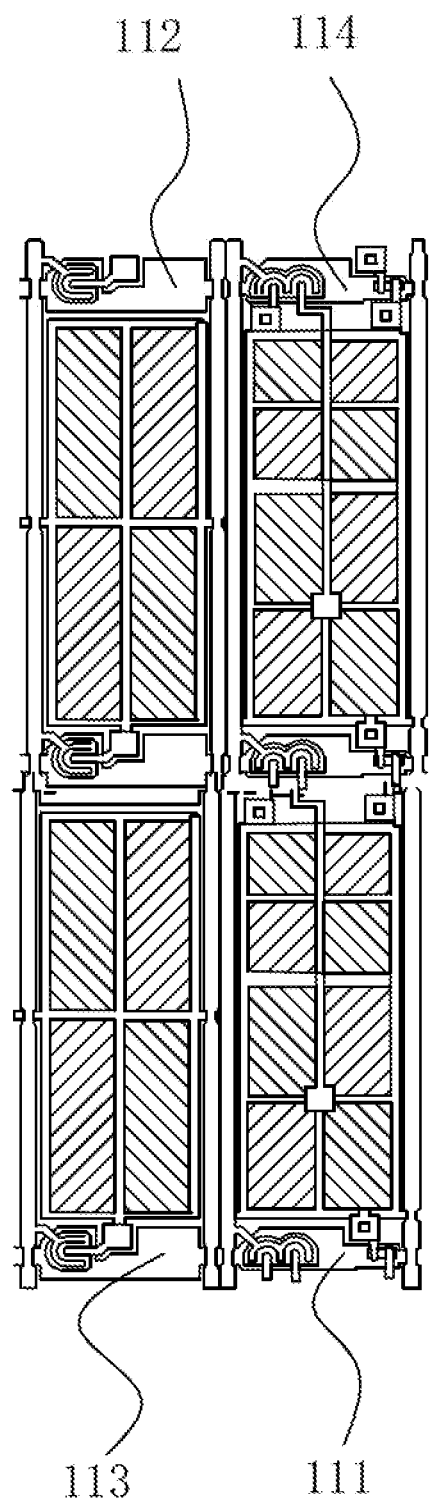
FIG. 3 is a schematic view of display panel RGBW arranged in two rows and two columns according to an embodiment of the present application.

In one or more embodiments, referring to FIG. 3, the first pixels 111, the second pixels 112, the third pixels 113, and the fourth pixels 114 are each one pixel group with two rows and two columns, and in each pixel group, the second pixels 112 and the third pixels 113 are in the same column; the first pixels 111 and the fourth pixels 114 are in the same column; the second pixels 112 and the fourth pixels 114 are in the same row, and the first pixels 111 and the third pixels 113 are in the same row.

Row and column arrangements are also possible in reverse.

In this solution, the first pixels 111, the second pixels 112, the third pixels 113, and the fourth pixels 114 are each one pixel group with two rows and two columns. The first pixels 111 and the fourth pixels 114 are arranged in the same column, and the second pixels 112 and the third pixels 113 are arranged in the same column. The white pixels are the first pixels 111; the lightness of the first pixels 111 is relatively brightest; the lightness of the fourth pixels 114 is relatively darkest; and the lightness of the second pixels 112 and the lightness of the third pixel 113 are medium. The first pixels 111 and the fourth pixels 114 are disposed in the same column, that is, the brightest pixels and the darkest pixels are arranged in the same column, and such an arrangement can disperse the lightness to achieve a uniform display effect.

In one or more embodiments, referring to FIG. 2, the first pixels 111, the second pixels 112, the third pixels 113, and the fourth pixels 114 are each one pixel group, and in each pixel group, the first pixels 111, the second pixels 112, the third pixels 113, and the fourth pixels 114 are in the same row.

In this solution, the first pixels 111, the second pixels 112, the third pixels 113, and the fourth pixels 114 are in one row, and the same row or the same column of a photomask has the same number of alignment regions; a pattern is the same, and the design of the photomask is simpler.

In one or more embodiments, the low domain region has four alignment regions, and the high domain region has eight alignment regions.

In this solution, the first, pixels 111 are correspondingly configured as a high domain region, and the number of alignment regions of the first pixels 111 is eight; the second pixels 112 are correspondingly configured as a low domain region, and the number of alignment regions of the second pixels 112 is four. The number of alignment regions of the first pixels 111 is eight. The display panel includes gate scan layers and common lines, and the first pixels 111 each include a main pixel and sub-pixels; the first pixels corresponding to the same gate scan layer are provided with three thin film transistors; drain electrodes of two of the thin film transistors are connected with the main pixel and the sub-pixels respectively, and source electrodes are connected with a same data line; a source electrode of the other thin film transistor is connected with the sub-pixels corresponding to the upper gate scan layer, and a drain electrode is connected to the common lines. The thin film transistors of the gate scan layer of the same layer are simultaneously switched on, the main pixel and the sub-pixels are simultaneously charged, and the charge amount of the main pixel and the sub-pixels are the same; when thin film transistor switches of the upper layer are switched off, the thin film transistors of the next layer are switched on. Since the sub-pixels of the upper layer and a common electrode have overlapping areas, a discharge capacitor is generated, and the power of the sub-pixels is lost to some extent. At this time, the voltage of the main pixel is greater than that of the sub-pixels, and the lightness of the sub-pixels is lower than that of the main pixel. According to the characteristics of the VA type, when the display panel 110 is of a large size, when viewed from different viewing angles, the lightness at both sides is higher, and unevenness in brightness and darkness may occur. The pixels are correspondingly configured as the high domain region for matching, and the brighter lightness at the two sides matches the darker lightness, thereby improving color shift.

RGBW is a design that can significantly improve the panel transmittance. A high-transmission W photoresist is added in an RGB photoresist, and the three colors are changed to four colors. The addition of the W photoresist can directly improve the transmittance by 50% and the RGBW transmittance is improved by 1.5 times:

$$\tfrac{1}{3}(R)+\tfrac{1}{3}(G)+\tfrac{1}{3}(B)+1(W)=1.5(\tfrac{1}{3}(R)+\tfrac{1}{3}(G)+\tfrac{1}{3}(B)+\tfrac{1}{3}(R))$$

The second pixels 112 have four alignment regions, which improves the transmittance with respect to the case where the number of the alignment regions is eight. The liquid crystal display in the high-resolution vertical alignment (VA) mode has a small pixel size. If the eight alignment regions are designed to improve the viewing angle, the aperture ratio will be further sacrificed. If the eight alignment regions are not designed, the viewing angle will be poor, so that the customer experience will be poor. This solution improves color shift as a whole at the expense of very little transmittance.

Figure 4:
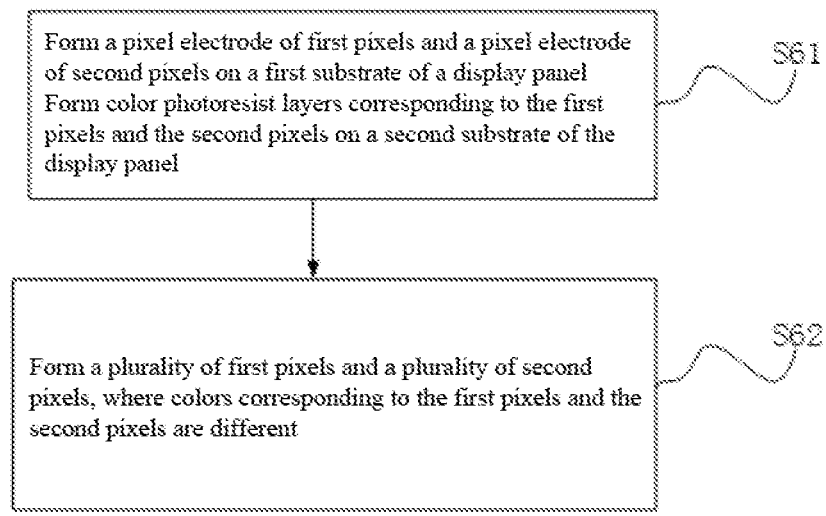
FIG. 4 is a flow chart of a manufacturing method for a display panel according to an embodiment of the present application.

As another embodiment of the present application, referring to FIG. 4, a manufacturing method for a display panel 110 is disclosed, and the method includes:

S61: Disposing a pixel electrode of the first pixels 111 and a pixel electrode of the second pixels 112 on a first substrate of the display panel 110, where the disposed electrode of the first pixels 111 includes pixel electrodes of main pixels and sub-pixels; dispose two thin film transistors on the first substrate, connect one of the thin film transistors with the main pixels to charge the main pixels, and connect the other thin film transistor with the sub-pixels to charge the sub-pixels.

Color photoresist layers corresponding to the first pixels 111 and the second pixels 112 are disposed on a second substrate of the display panel 110.

Certainly, it is also possible to provide the color photoresist layer and the pixel electrode layer on the same substrate.

S62: Disposing a plurality of first pixels 111 and a plurality of second pixels 112, where colors corresponding to the first pixels 111 and the second pixels 112 are different.

The first pixels 111 are configured as a high domain region, and the second pixels 112 are configured as a low domain region; and the number of alignment regions of the high domain region is greater than that of alignment regions of the low domain region.

In this solution, the display panel 110 includes first pixels 111 and second pixels 112: the number of the first pixels 111 and the number of the second pixels 112 are plural; the first pixels 111 are correspondingly configured as a high domain region, and the second pixels 112 are correspondingly configured as a low domain region. The number of alignment regions of the first pixels 111 and the number of alignment regions of the second pixels 112 are different. With respect to a solution of configuring the first pixels 111 and the second pixels 112 as high domain regions, the number of the alignment regions of the high domain regions is large, and the configuration viewing angle of the high domain regions is good, and the configuration of the high domain regions reduces the aperture area and thus sacrifices the aperture ratio; with respect to a solution of configuring the first pixels 111 and the second pixels 112 as low domain regions, the configuration of the low domain regions allows the aperture area to be relatively large and the aperture ratio to be high. However, the viewing angle will be poor, so that the customer experience will be poor. In this solution, the high domain region and the low domain region are in hybrid configuration; the configuration of the low domain region ensures a certain transmittance, and the configuration of the high domain region improves color shift of a large viewing angle, so that the hybrid configuration of the high domain region and the low domain region improves color shift and the quality of the display panel 110 at a large viewing angle of the product while ensuring a certain transmittance. The number of alignment regions of pixels in the same row or in the same column is the same, and the same row or the same column of a photomask has the same number of alignment regions; a pattern is the same, and the design of the photomask is simpler.

Figure 5:
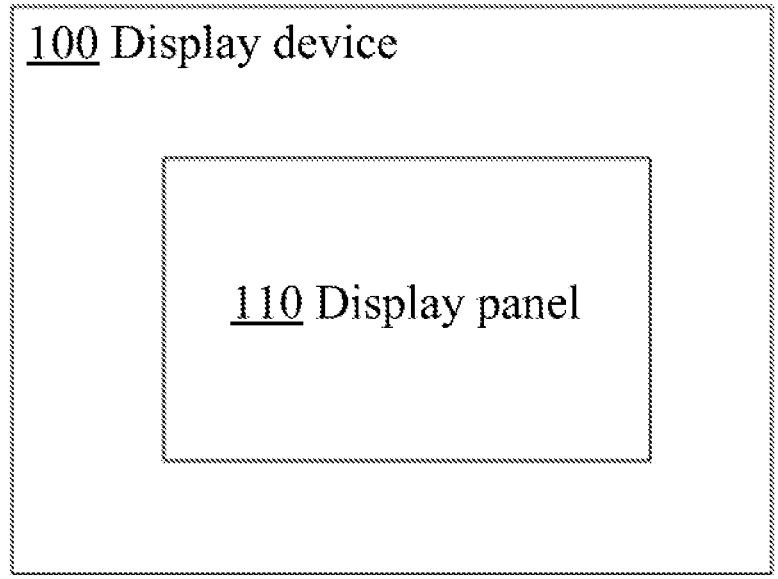
FIG. 5 is a schematic view of a display device according to an embodiment of the present application.

As another embodiment of the present application, referring to FIG. 5, a display device 100 is disclosed, including the display panel 110 as described above.

In this solution, the display panel 110 includes first pixels 111 and second pixels 112; the number of the first pixels 111 and the number of the second pixels 112 are plural; the first pixels 111 are correspondingly configured as a high domain region, and the second pixels 112 are correspondingly configured as a low domain region. The number of alignment regions of the first pixels 111 and the number of alignment regions of the second pixels 112 are different. With respect to a solution of configuring the first pixels 111 and the second pixels 112 as high domain regions, the number of the alignment regions of the high domain regions is large, and the configuration viewing angle of the high domain regions is good, and the configuration of the high domain regions reduces the aperture area and thus sacrifices the aperture ratio; with respect to a solution of configuring the first pixels 111 and the second pixels 112 as low domain regions, the configuration of the low domain regions allows the aperture area to be relatively large and the aperture ratio to be high. However, the viewing angle will be poor, so that the customer experience will be poor. In this solution, the high domain region and the low domain region are in hybrid configuration; the configuration of the low domain region ensures a certain transmittance, and the configuration of the high domain region improves color shift of a large viewing angle, so that the hybrid configuration of the high domain region and the low domain region improves color shift and the quality of the display panel 110 at a large viewing angle of the product while ensuring a certain transmittance. The number of alignment regions of pixels in the same row or in the same column is the same, and the same row or the same column of a photomask has the same number of alignment regions; a pattern is the same, and the design of the photomask is simpler.

It should be noted that it is not determined that the limitation of each step involved in this solution limits the sequence of steps on the premise of affecting the implementation of the specific solution. The previous steps may be performed first, or may also be executed later, or even executed at the same time, which should be considered as being within the scope of protection of the present application as long as this solution can be implemented.

The panel of the present application may be a twisted nematic (TN) panel, an in-plane switching (IPS) panel, or a multi-domain vertical alignment (VA) panel, and of course, the panel may also be other types of panels, as long as the panels are applicable.

The above are further detailed descriptions of the present application in conjunction with the specific optional embodiments, but the specific implementation of the present application cannot be determined as limited to these descriptions. For a person of ordinary skill in the art to which the present application pertains, a number of simple deductions or substitutions may also be made without departing from the concept of the present application. All these should be considered as falling within the scope of protection of the present application.

What is claimed is:

1. A display panel, comprising:
a plurality of first pixels and a plurality of second pixels, wherein a color of each first pixel is different from that of each second pixel;
the first pixels are configured as a high domain region, and the second pixels are configured as a low domain region; the number of alignment regions of the high domain region is greater than that of alignment regions of the low domain region; and
in the display panel, the number of alignment regions of the pixels of the same row or the same column is the same;
wherein the white pixels are the first pixels, the white pixels are correspondingly configured as a high domain region, and the brightness of the first pixels is higher than that of the second pixels;
wherein the display panel comprises gate scan layers and common lines, and the first pixels each comprise a main pixel and sub-pixels; the first pixels corresponding to the same gate scan layer are provided with three thin film transistors; drain electrodes of two of the thin film transistors are connected with the main pixel and the sub-pixels respectively, and source electrodes are connected with a same data line; a source electrode of the other thin film transistor is connected with the sub-pixels corresponding to the upper gate scan layer, and a drain electrode is connected to the common lines.

2. The display panel according to claim 1, wherein the display panel comprises third pixels and fourth pixels; the second pixels and the third pixels correspond to low domain regions, and the fourth pixels correspond to a high domain region; the brightness of the first pixels is the highest, and the brightness of the fourth pixels is the lowest.

3. The display panel according to claim 2, wherein the second pixels are red pixels; the third pixels are green pixels; and the fourth pixels are blue pixels.

4. The display panel according to claim 2, wherein the first pixels, the second pixels, the third pixels, and the fourth pixels are each one pixel group with two rows and two columns, and in each pixel group, the second pixels and the third pixels are in the same column; the first pixels and the fourth pixels are in the same column; the second pixels and the fourth pixels are in the same row, and the first pixels and the third pixels are in the same row.

5. The display panel according to claim 2, wherein the first pixels, the second pixels, the third pixels, and the fourth pixels are each one pixel group with two rows and two columns, and in each pixel group, the second pixels and the third pixels are in the same row; the first pixels and the fourth pixels are in the same row; the second pixels and the fourth pixels are in the same column, and the first pixels and the third pixels are in the same column.

6. The display panel according to claim 2, wherein the first pixels, the second pixels, the third pixels, and the fourth pixels are each one pixel group, and in each pixel group, the first pixels, the second pixels, the third pixels, and the fourth pixels are in the same row.

7. The display panel according to claim 1, wherein the low domain region has four alignment regions, and the high domain region has eight alignment regions.

8. The display panel according to claim 1, wherein the display panel comprises third pixels and fourth pixels; the second pixels and the third pixels correspond to low domain regions, and the fourth pixels correspond to a high domain region; the brightness of the first pixels is the highest, and the brightness of the fourth pixels is the lowest;
  wherein the second pixels are red pixels; the third pixels are green pixels; and the fourth pixels are blue pixels;
  wherein the first pixels, the second pixels, the third pixels, and the fourth pixels are each one pixel group, and in each pixel group, the first pixels, the second pixels, the third pixels, and the fourth pixels are in the same row.

9. A manufacturing method for a display panel applied to the above display panel, comprising steps of:
  setting a plurality of first pixels and a plurality of second pixels, wherein colors corresponding to the first pixels and the second pixels are different;
  wherein the first pixels are configured as a high domain region, and the second pixels are configured as a low domain region; the number of alignment regions of the high domain region is greater than that of alignment regions of the low domain region; and
  in the display panel, the number of alignment regions of the pixels of the same row or the same column is the same;
  wherein the white pixels are the first pixels, the white pixels are correspondingly configured as a high domain region, and the brightness of the first pixels is higher than that of the second pixels;
  wherein the display panel comprises gate scan layers and common lines, and the first pixels each comprise a main pixel and sub-pixels; the first pixels corresponding to the same gate scan layer are provided with three thin film transistors; drain electrodes of two of the thin film transistors are connected with the main pixel and the sub-pixels respectively, and source electrodes are connected with a same data line; a source electrode of the other thin film transistor is connected with the sub-pixels corresponding to the upper gate scan layer, and a drain electrode is connected to the common lines.

10. The manufacturing method for a display panel according to claim 9, wherein the step of setting a plurality of first pixels and a plurality of second pixels comprises:
  disposing a pixel electrode of the first pixels and a pixel electrode of the second pixels on a first substrate of the display panel; and
  disposing color photoresist layers corresponding to the first pixels and the second pixels on a second substrate of the display panel.

11. A display device, comprising a display panel, wherein the display panel comprises:
  a plurality of first pixels and a plurality of second pixels, wherein a color of each first pixel is different from that of each second pixel;
  the first pixels are configured as a high domain region, and the second pixels are configured as a low domain region; the number of alignment regions of the high domain region is greater than that of alignment regions of the low domain region; and
  in the display panel, the number of alignment regions of the pixels of the same row or the same column is the same;
  wherein the white pixels are the first pixels, the white pixels are correspondingly configured as a high domain region, and the brightness of the first pixels is higher than that of the second pixels;
  wherein the display panel comprises gate scan layers and common lines, and the first pixels each comprise a main pixel and sub-pixels; the first pixels corresponding to the same gate scan layer are provided with three thin film transistors; drain electrodes of two of the thin film transistors are connected with the main pixel and the sub-pixels respectively, and source electrodes are connected with a same data line; a source electrode of the other thin film transistor is connected with the sub-pixels corresponding to the upper gate scan layer, and a drain electrode is connected to the common lines.

12. The display device according to claim 11, wherein a second pixels and a third pixels correspond to low domain regions, and the fourth pixels correspond to a high domain region; the brightness of the first pixels is the highest, and the brightness of the fourth pixels is the lowest.

13. The display device according to claim 12, wherein the first pixels, the second pixels, the third pixels, and the fourth pixels are each one pixel group with two rows and two columns, and in each pixel group, the second pixels and the third pixels are in the same column; the first pixels and the fourth pixels are in the same column; the second pixels and the fourth pixels are in the same row, and the first pixels and the third pixels are in the same row.

14. The display device according to claim 12, wherein the first pixels, the second pixels, the third pixels, and the fourth pixels are each one pixel group, and in each pixel group, the first pixels, the second pixels, the third pixels, and the fourth pixels are in the same row.

15. The display device according to claim 11, wherein the low domain region has four alignment regions, and the high domain region has eight alignment regions.

* * * * *